UNITED STATES PATENT OFFICE.

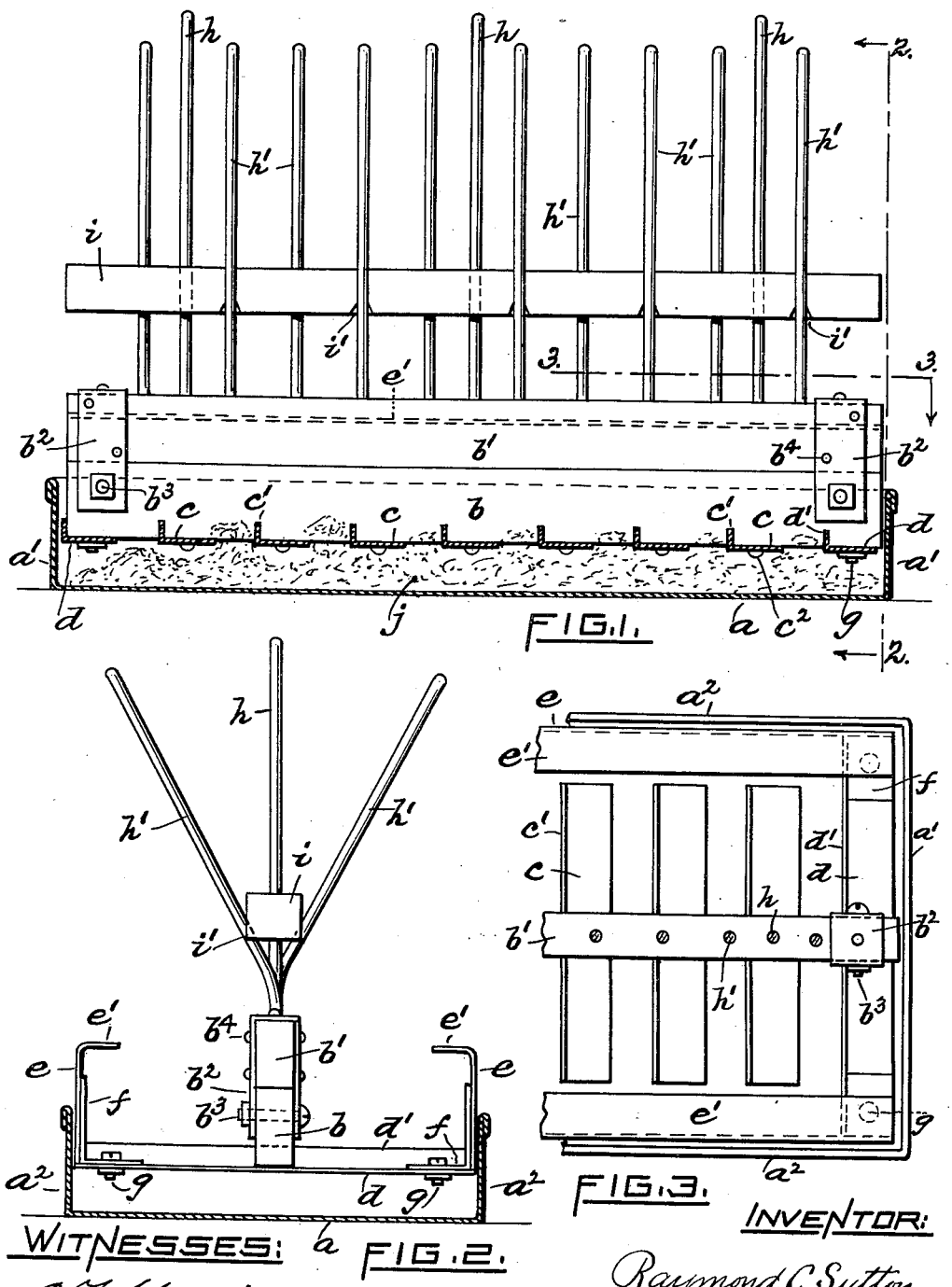

RAYMOND C. SUTTON, OF NORTH ATTLEBORO, MASSACHUSETTS.

GUARD FOR FEED-TROUGHS.

1,100,927. Specification of Letters Patent. Patented June 23, 1914.

Application filed January 22, 1914. Serial No. 813,768.

*To all whom it may concern:*

Be it known that I, RAYMOND C. SUTTON, a citizen of the United States, residing at North Attleboro, in the county of Bristol and State of Massachusetts, have invented certain new and useful Improvements in Guards for Feed-Troughs, of which the following is a specification.

My invention relates to improvements in guards for feed troughs for poultry, pigeons and the like, and the purpose of my invention is to provide a guard to be placed in a poultry feeding trough which will at once retain the feed within the trough and at the same time give free access to the same by the poultry; and further to provide an additional protection to the trough that will prevent the poultry from walking over and upon the same. I accomplish these ends by the device shown in the accompanying drawings in which—

Figure 1 shows a vertical section of a feed trough with a front elevation of my invention. Fig. 2, a cross section of a trough with an end elevation of the guard on the line 2—2 of Fig. 1, and Fig. 3, a horizontal section of my invention on the line 3—3 of Fig. 1.

The same parts are referred to by the same letters throughout the several views.

In Fig. 1, $a$—$a'$—$a'$ represents a vertical section of an ordinary feed trough; $j$ representing the grain or feed placed therein. $b$—$b'$ represents two longitudinal members, made preferably of hard wood, secured together by the clamps $b^2$—$b^2$ secured by the bolts and screws $b^3$—$b^4$. At the bottom of the member $b$ are fastened cross pieces $c$—$c$, etc., made preferably of sheet metal and bent at right angles, as shown in Fig. 1 at $c'$—$c'$, the vertical portion shown in Fig. 1 fitting into saw scarfs or slots cut crosswise in the member $b$. These cross pieces $c$—$c'$ may be made of wood, if desired, and fastened to the bottom of $b$ by nails or other suitable means. These are spaced, as shown in Fig. 3 and the spaces between them give ample room for the grain to be reached by the poultry. At the same time the cross pieces $c$—$c$ prevent the poultry from throwing the grain outside of the trough proper $a$—$a'$. The cross pieces at the two ends of my device, marked in the drawings $d$—$d$, extend beyond the other cross pieces and are provided with the brackets $f$—$f$, seen best in Fig. 2 to which are fixed longitudinal side members $e$—$e$ running the entire length of the trough and bent over at the top forming a lip or flange $e'$—$e'$ seen best in Fig. 2; these flanges $e'$—$e'$ also serving to retain the grain within the trough. If made of metal, as shown in the present drawings, additional strength and stiffness are given by flanging the cross pieces $c$—$c$, $d$—$d$, by the flanges $c'$—$c'$, $d'$—$d'$, and inserting these flanged pieces into saw scarfs made in the member $b$, as above stated. The bracket pieces $f$—$f$ are fastened to the cross pieces $d$—$d$ by means of the bolts $g$—$g$. Above the longitudinal strip $b$—$b$ is placed a similar strip $b'$ secured to $b$ by the clamps $b^2$—$b^2$ through the medium of the bolts $b^3$ or the studs or rivets $b^4$.

As it is the invariable custom of poultry, if not prevented, to walk in and upon the grain in the feed trough, I have provided an additional protection to the trough by the devices shown by $h$—$h'$, etc., in Figs. 1 and 2.

$h$—$h$ are metal pins fastened to the member $b'$ or inserted firmly therein and projecting vertically upward at intervals throughout the length of $b'$. Inserted also at definite spaced intervals in the longitudinal strip $b'$ are the members $h'$—$h'$ which are also metal rods bent outwardly at an angle as shown at Fig. 2. The angular members $h'$—$h'$ prevent the poultry from getting into or upon the trough while the vertical members $h$ prevent the poultry from walking along the strip $i$ between the members $h'$—$h'$.

$i$ is a longitudinal strip of wood, or other material, which is grooved as shown at $i'$—$i'$ in Fig. 1, and also in Fig. 2; these grooves being adapted to fit the rods $h'$—$h'$ and prevent their rotation; while the vertical rods $h$—$h$—$h$ brace the rod $i$ and serve to retain it in position.

The relative proportions of my device and the containing trough are such that as the grain or other food is consumed by the poultry, my device will gradually sink lower in the trough, its weight being such as to press the contents into the spaces between the transverse bars $c$ and thus prevent the food from clogging beneath them.

It will be seen that there is a considerable free space between the ends of the bars $c$ and the sides of the containing trough, this additional space also aiding in preventing a clogging of the food in the trough.

By the separation of the members $b$ and $b'$ either may be used separately in connection with a feed trough.

Having now described my invention, what I claim and desire to secure by Letters Patent is:—

1. A guard for feed troughs consisting of a longitudinal member having fixed transversely upon the bottom thereof a series of spaced bars; a second longitudinal member separably attached to said first member, said second longitudinal member having projecting upwardly from the top thereof a series of pins, a part thereof being arranged vertically and the remainder bent outwardly at an angle from the vertical, substantially as set forth.

2. In a guard for feed troughs the combination of a longitudinal member having fixed transversely upon the bottom thereof a series of spaced bars; side pieces supported by the two end bars of said series and provided with an inwardly projecting lip, a second longitudinal member separably attached to said first longitudinal member; a series of pins fixed in said second longitudinal member, a part thereof being arranged vertically, and a part bent outwardly at an angle from the vertical; and a stiffening member pierced by said vertical pins and grooved for the reception of said bent pins, all substantially as described for the purpose specified.

In testimony whereof I affix my signature in presence of two witnesses.

RAYMOND C. SUTTON.

Witnesses:
 THOMAS P. CORCORAN,
 EDITH M. BROMLEY.

Copies of this patent may be obtained for five cents each, by addressing the "Commissioner of Patents, Washington, D. C."